(12) United States Patent
Shiga

(10) Patent No.: US 11,554,694 B2
(45) Date of Patent: Jan. 17, 2023

(54) VEHICLE SEAT CONTROL DEVICE

(71) Applicant: Toyota Jidosha Kabushiki Kaisha, Toyota (JP)

(72) Inventor: Kazuyuki Shiga, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 599 days.

(21) Appl. No.: 16/590,745

(22) Filed: Oct. 2, 2019

(65) Prior Publication Data
US 2020/0108744 A1    Apr. 9, 2020

(30) Foreign Application Priority Data

Oct. 4, 2018   (JP) ............................. JP2018-188968

(51) Int. Cl.
| | | |
|---|---|---|
| *B60N 2/30* | (2006.01) | |
| *A61G 3/02* | (2006.01) | |
| *B60N 2/02* | (2006.01) | |

(52) U.S. Cl.
CPC ............ *B60N 2/3047* (2013.01); *A61G 3/02* (2013.01); *B60N 2/0244* (2013.01); *B60N 2/3009* (2013.01)

(58) Field of Classification Search
CPC .. B60N 2/3047; B60N 2/0244; B60N 2/3009; A61G 3/02
USPC .......................................................... 701/49
See application file for complete search history.

(56) References Cited

U.S. PATENT DOCUMENTS

2004/0113451 A1* 6/2004 Szymanski ........ B60N 2/01516
                                                         296/65.05
2016/0159251 A1* 6/2016 Ebina ....................... B60N 2/22
                                                            701/49

FOREIGN PATENT DOCUMENTS

| JP | 2002-007526 | A |   | 1/2002 |
| JP | 2003-308596 | A |   | 10/2003 |
| JP | 2004-034787 |   | * | 2/2004 |
| JP | 2005-255307 |   | * | 9/2005 |
| JP | 2009-187408 |   | * | 8/2009 |
| JP | 2018-055538 | A |   | 4/2018 |

OTHER PUBLICATIONS

Machine Translation of the Abe (JP2009187408) description from espacenet.com (Year: 2009).*

* cited by examiner

*Primary Examiner* — Mark R Wendell
(74) *Attorney, Agent, or Firm* — Dinsmore & Shohl LLP

(57) ABSTRACT

A vehicle seat control device including a control unit that, in a case in which at least one user has declared in advance a desire to board a self-driving vehicle having a plurality of seats that are switchable between a first state in which a user is able to sit down, and a second state that impedes a user sitting down, switches a same number of seats as a number of the at least one user to the first state before the at least one user boards the vehicle.

6 Claims, 12 Drawing Sheets

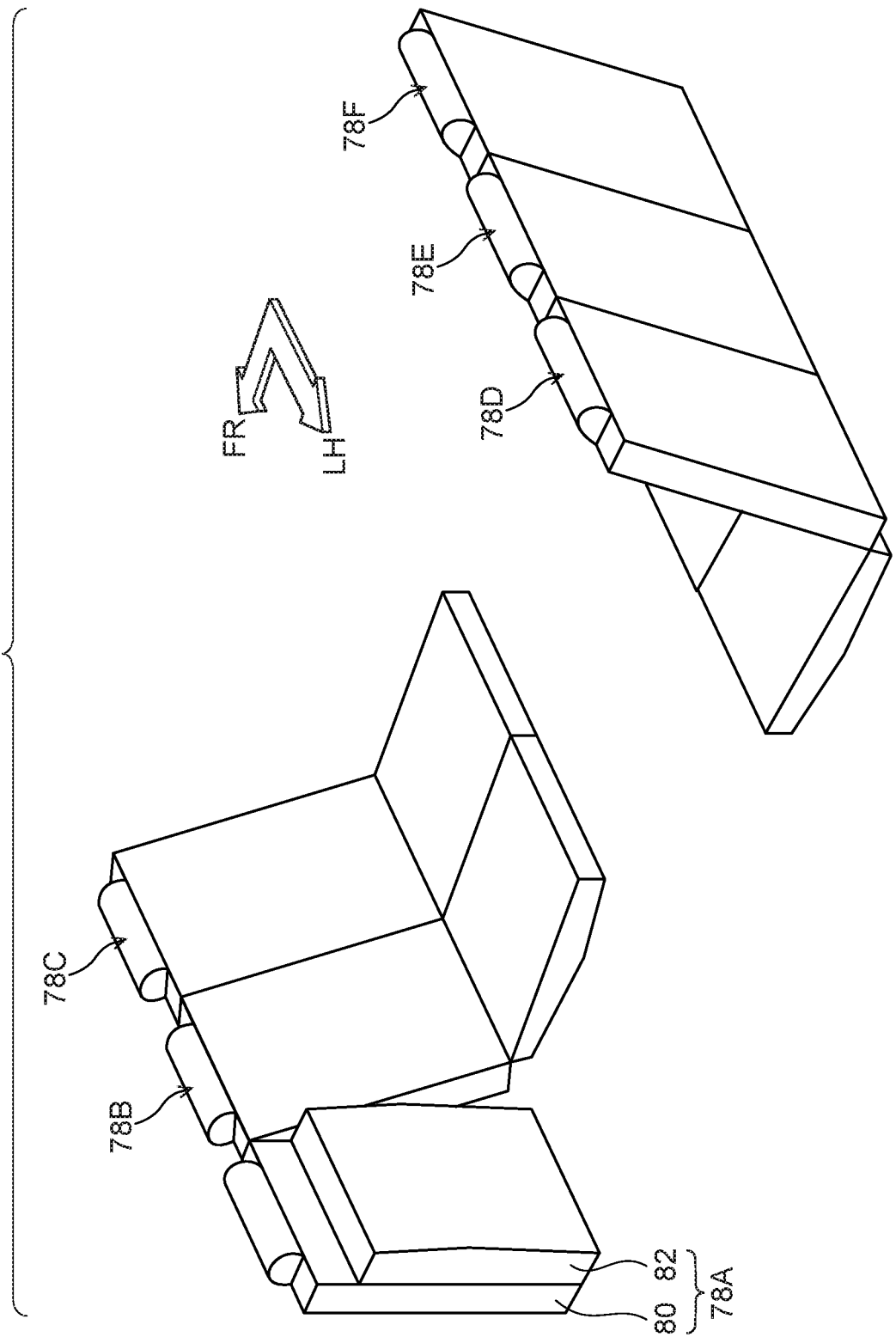

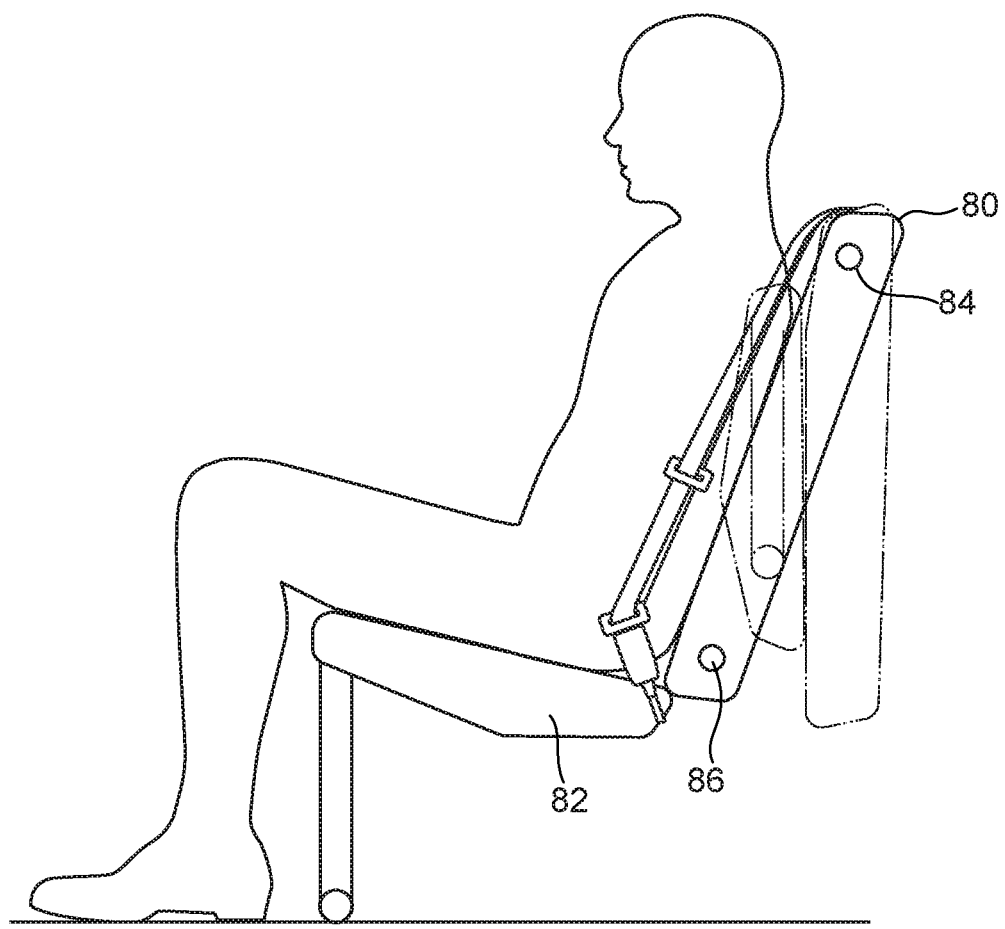

FIG.6

| VEHICLE ID | CURRENT LOCATION | PLANNED ROUTE | NUMBER OF PERSONS BOOKING | WHEELCHAIR USERS | SEAT 1 STATE | SEAT 1 ALIGHTING DESTINATION | SEAT 2 STATE | SEAT 2 ALIGHTING DESTINATION | SEAT 3 STATE | SEAT 3 ALIGHTING DESTINATION | SEAT 4 STATE | SEAT 4 ALIGHTING DESTINATION |
|---|---|---|---|---|---|---|---|---|---|---|---|---|
| 0001 | LOCATION a | a→b | 1 | NONE | FOLDED DOWN/ OCCUPIED | LOCATION b | FOLDED UP | — | FOLDED UP | — | FOLDED UP | — |
| 0002 | LOCATION c | c→d→e | 2 | YES | FOLDED UP/ WHEELCHAIR | LOCATION d | FOLDED UP/ WHEELCHAIR | LOCATION d | FOLDED UP | — | FOLDED DOWN/ OCCUPIED | LOCATION e |
| ... | | | | | | | | | | | | |

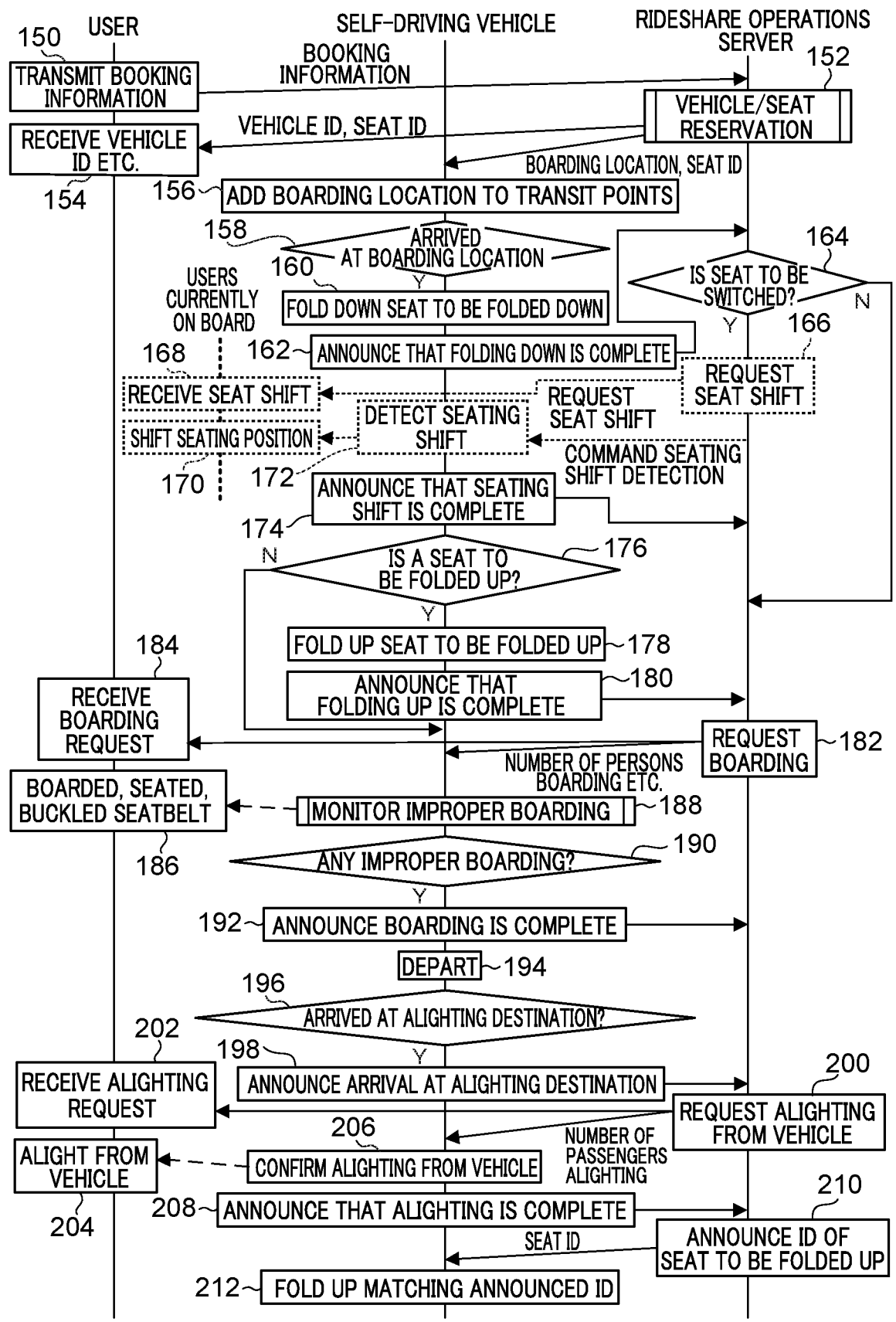

VEHICLE SEAT CONTROL DEVICE

CROSS-REFERENCE TO RELATED APPLICATION

This application is based on and claims priority under 35 USC 119 from Japanese Patent Application No. 2018-188968, filed on Oct. 4, 2018, the disclosure of which is incorporated by reference herein.

BACKGROUND

Technical Field

The present disclosure relates to a vehicle seat control device.

Related Art

Ridesharing, which is a service used to match the needs of vehicle car-pooling users, has become increasingly common in recent years, and technology that helps promote ridesharing has also been proposed. For example, Japanese Patent Application Laid-Open (JP-A) No. 2018-055538 discloses a technology in which a planned route of a vehicle acquired from a first terminal can be viewed on a second terminal, and request information input into the second terminal that includes locations where a user wishes to be picked up and dropped off is transmitted to the first terminal, and an acceptance or refusal of this request information input via the first terminal is transmitted back to the second terminal.

In existing ridesharing systems including the technology described in JP-A No. 2018-055538, although it is assumed that a vehicle driven by a driver is being used, vehicle self-driving technology has now advanced to the point where self-driving vehicles equipped with a self-driving function can be used for ridesharing. However, if a self-driving vehicle in which no crewperson, such as a driver or the like, is present is used for ridesharing, then when, for example, users are boarding a self-driving vehicle, there is a possibility of improper boarding occurring such as when a greater number of users board a vehicle than the previously declared number of users.

SUMMARY

The present disclosure provides a vehicle seat control device that may inhibit improper boarding, such as when a greater number of users board a self-driving vehicle than a previously declared number of users.

A first aspect of the present disclosure is a vehicle seat control device including: a control unit that, in a case in which at least one user has declared in advance a desire to board a self-driving vehicle having plural seats that are switchable between a first state in which a user is able to sit down, and a second state that impedes a user sitting down, switches a same number of seats as a number of the at least one user to the first state before the at least one user boards the vehicle.

In the first aspect of the present disclosure, plural seats that are capable of being switched between a first state in which a user is able to sit down, and a second state in which it is difficult for a user to sit down, are provided in a self-driving vehicle. When users have declared in advance their wish to board this self-driving vehicle, the same number of seats as the number of users who have declared their wish to board this self-driving vehicle are switched to the first state before the users making this declaration board the vehicle. As a result, if users in excess of the number of users who have previously declared their wish to board attempt to board the self-driving vehicle, these users in excess of the previously declared number of users may be prevented from sitting down in the seats. Accordingly, the first aspect of the present disclosure may inhibit improper boarding, such as when a greater number of users board a self-driving vehicle than a previously declared number of users.

In a second aspect of the present disclosure, in the above-described first aspect, may further include a detection unit that detects users present within a vehicle cabin of the self-driving vehicle, wherein, in a case in which the at least one user has boarded the vehicle, the control unit may stop the self-driving vehicle from traveling, if an increase in a number of users detected by the detecting unit is greater than the number of the at least one user.

In the second aspect of the present disclosure, users present within the vehicle cabin of a self-driving vehicle are detected, and when the declared users have boarded the vehicle, if the increase in the detected number of users is greater than the number of users who have declared their intention to board, then the self-driving vehicle is prevented from traveling. As a result, the second aspect of the present disclosure may more reliably inhibit improper boarding, such as when a greater number of users board a self-driving vehicle than a previously declared number of users.

In a third aspect of the present disclosure, in the above-described aspects, in a case in which a particular user disembarks from the self-driving vehicle, the control unit may switch a seat vacated by the particular user to the second state.

In the third aspect of the present disclosure, when a user has alighted from a self-driving vehicle, the seat vacated by the alighted user is switched to the second state. As a result, the third aspect of the present disclosure may additionally inhibit improper boarding such as when, for example, a person who has not declared their wish to board boards the vehicle and sits in the seat in place of an alighted user.

In a fourth aspect of the present disclosure, in the above-described aspects, in a case in which the at least one user includes a user using a wheelchair, the control unit may switch one or more seats that correspond to a boarding position of the user using the wheelchair to the second state, before the at least one user boards the vehicle.

In the fourth aspect of the present disclosure, if a user using a wheelchair boards the vehicle, the boarding space for the wheelchair user is guaranteed. Accordingly, the fourth aspect of the present disclosure may also make provision for the boarding of wheelchair users as well.

A fifth aspect of the present disclosure, in the above-described fourth aspect, seats corresponding to the boarding position of the user using the wheelchair may be plural seats arranged side-by-side.

In the fifth aspect of the present disclosure, plural seats that are arranged side-by-side are used for the seats corresponding to the boarding position of the wheelchair user. Accordingly, the fifth aspect of the present disclosure may enable a wheelchair user to recognize their own boarding space.

In a sixth aspect of the present disclosure, in the above-described first aspect, in a case in which a first user is sitting in a first one of the plural seats, and in a case in which a second user, who intends to disembark from the vehicle prior to the first user, declares a wish to board when no user is sitting in a second one of the plural seats, which is further from an entry/exit of the self-driving vehicle than the first one of the plural seats, the control unit may switch the second one of the plural seats to the first state before the second user boards the vehicle and requests the first user to move to the second one of the plural seats, and may request the second user to sit in the first one of the plural seats, which has been maintained in the first state.

In the sixth aspect of the present disclosure, if a second user who will be alighting from the vehicle before a first user who is already sitting in a first seat boards the vehicle, the first user is asked to move to a second seat which is further from the vehicle entry/exit, and the second user is seated in the first seat which is nearer to the vehicle entry/exit. As a result of this, getting on and getting off the vehicle may be made easier when the second user alights from the vehicle.

In a seventh aspect of the present disclosure, in the above-described aspects, each seat may include a seat back portion and a seat cushion portion, and the seat back portion is configured to pivot around a first hinge that is disposed in a vicinity of an upper end portion of the seat back portion, and the seat cushion portion is configured to pivot around a second hinge that is disposed in a vicinity of a lower end portion of the seat back portion, and the second state may be a state in which the seat back portion is pivoted around the first hinge so as to extend in a vertical direction, and the seat cushion portion is pivoted around the second hinge so as to be parallel with the seat back portion.

In the seventh aspect of the present disclosure, in the second state, a seat back portion is pivoted around a first hinge so as to extend in a vertical direction, and a seat cushion portion is pivoted around a second hinge so as to be parallel with the seat back portion. Note that a state in which the seat back portion extends in a vertical direction refers to a state in which a longitudinal direction of the seat back portion is within a predetermined angle relative to the vertical direction. In addition, a state in which the seat cushion portion is parallel with the seat back portion refers to a state in which an angle formed between a longitudinal direction of the seat cushion portion and the longitudinal direction of the seat back portion is within a predetermined angle. As a result, since a seat that has been switched to the second state is folded up so that an occupiable space thereof is reduced to a minimum, vehicle interior space inside a self-driving vehicle may be utilized effectively.

According to the above-described aspects, a vehicle seat control device of the present disclosure may inhibit improper boarding, such as when a greater number of users board a self-driving vehicle than a previously declared number of users.

BRIEF DESCRIPTION OF THE DRAWINGS

Exemplary embodiments of the present disclosure will be described in detail based on the following figures, wherein:

FIG. 4 is a perspective view showing plural seats provided in a self-driving vehicle;

FIG. 5 is a side view showing a switch between a folded down state and a folded up state of a seat;

FIG. 6 is a table showing an example of vehicle control information;

FIG. 7 is a sequence diagram showing an example of a flow of processing in a rideshare system;

DETAILED DESCRIPTION

Figure 1:
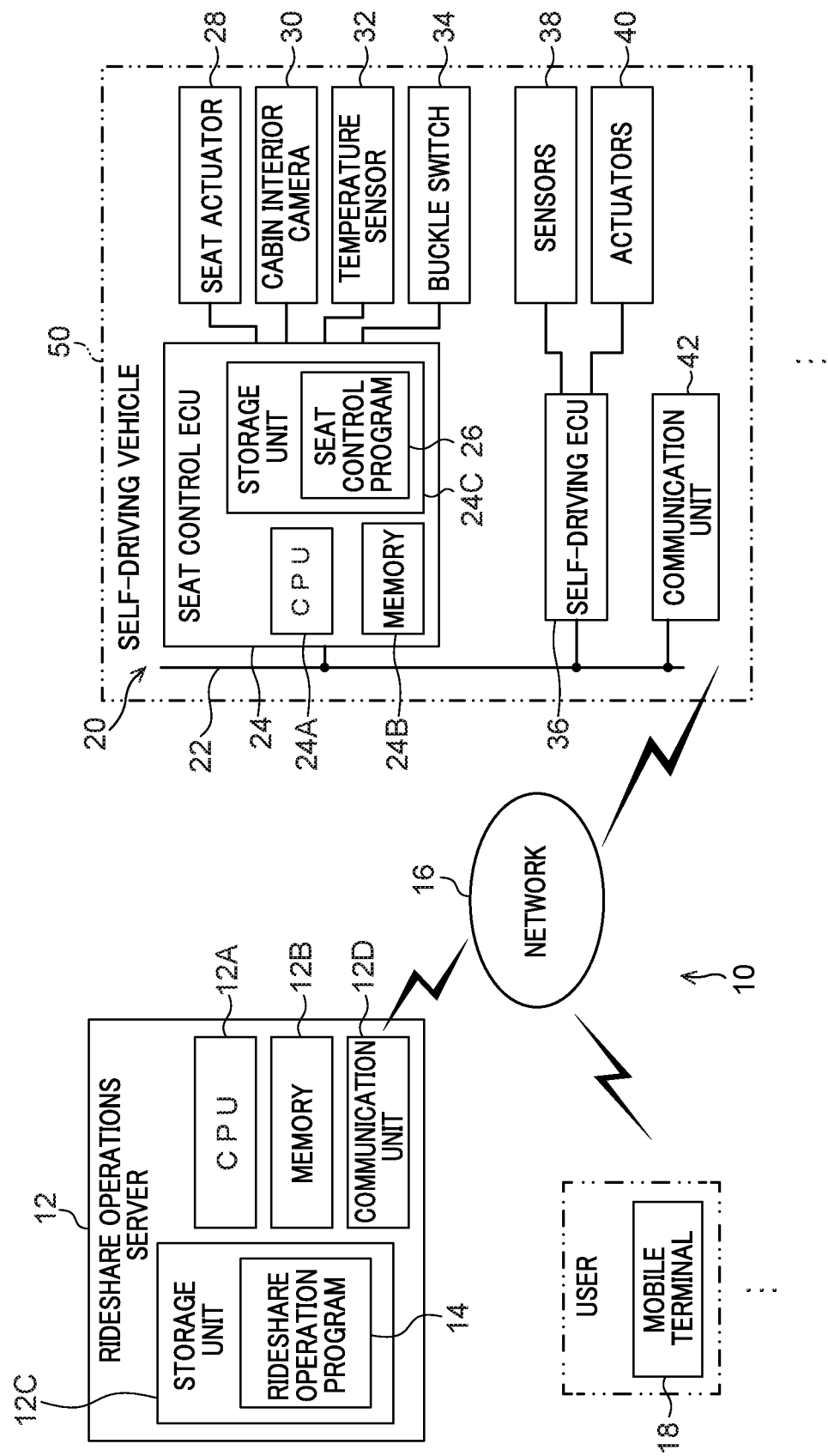
FIG. 1 is a schematic block drawing of a rideshare system according to an exemplary embodiment.

Hereinafter, an example of an exemplary embodiment of the present disclosure will be described in detail with reference to the drawings. A rideshare system 10 according to the exemplary embodiment is shown in FIG. 1. The rideshare system 10 includes a server 12 for rideshare operations (hereinafter, referred to simply as a server 12). The server 12 includes a CPU 12A, memory 12B, a non-volatile storage unit 12C that stores a rideshare operation program 14, and a communication unit 12D that performs communication via a network 16. The server 12 performs rideshare operation processing (described below in detail) as a result of the rideshare operation program 14 read from the storage unit 12C being expanded in the memory 12B and then executed by the CPU 12A.

Individual users using the rideshare service operated by the server 12 each carry a mobile terminal 18. The mobile terminals 18 are provided with a function of performing communication with the server 12 and the like via the network 16 and, more specifically, the mobile terminals 18 may be formed, for example, by a smartphone or a tablet device or the like.

In addition, the rideshare system 10 includes plural self-driving vehicles 50 (hereinafter, referred to as 'vehicles 50') in which an on-board system 20 is installed and that are provided with a function of performing self-driving. The structure of the vehicles 50 will be described below prior to the description of the on-board system 20.

Figure 2:
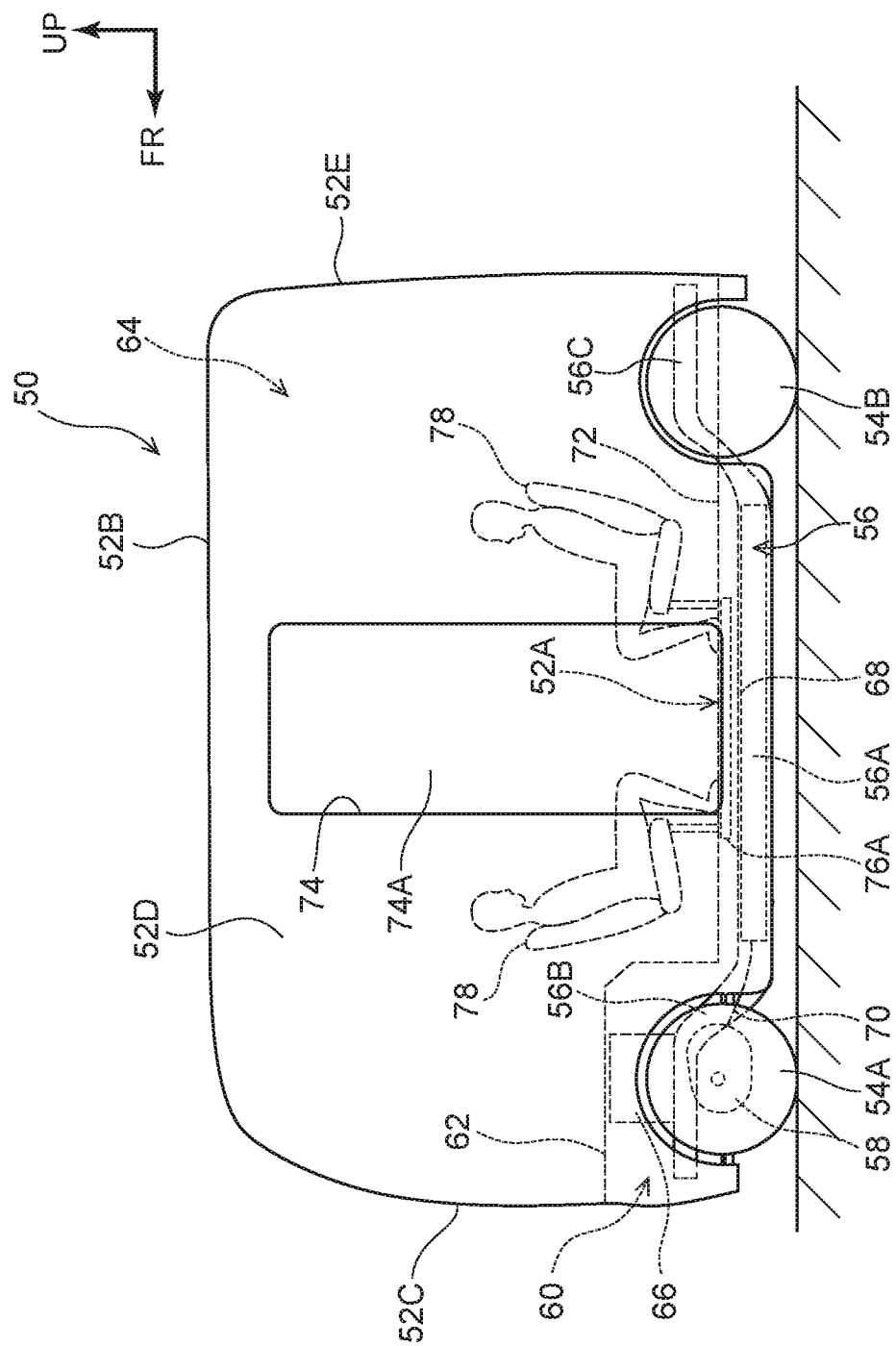
FIG. 2 is a side view showing a schematic structure of a self-driving vehicle.

As is shown in FIG. 2, the vehicles 50 have a substantially rectangular parallelepiped-shaped external appearance that is enclosed by a roof 52B, a front wall portion 52C, side wall portions 52D, and a rear wall portion 52E. Front wheels 54A are provided at the vehicle front side, and rear wheels 54B are provided at the vehicle rear side.

A pair of side members 56 that extend in a vehicle front-rear direction are provided in a vehicle lower portion of the vehicle 50. These side members 56 have a center side-member 56A that extends from a vehicle rearward portion of the front wheel 54A to a vehicle forward portion of the rear wheel 54B, and a front side-member 56B that is bent from the center side-member 56A towards an inner side in a vehicle width direction and towards a vehicle upper side, and from there extends towards the vehicle front side. The side members 56 also have a rear side-member 56C that is bent from the center side-member 56A towards an inner side in a vehicle width direction and towards a vehicle upper side, and from there extends towards the vehicle rear side. A drive unit 58 that is used to drive the front wheels 54A is fixed to the front side-members 56B, and a rear axle (not shown in the drawings) that supports the rear wheels 54B is fixed to the rear side-members 56C.

The vehicle 50 is provided with a power unit compartment 60 in which the drive unit 58 is housed, and vehicle cabin 64 that is partitioned off from the power unit compartment 60 by a dash panel 62. In addition to the drive unit 58, a power unit 66, which serves as a high-voltage component, is also housed within the power unit compartment 60. The drive unit 58 is provided with at least a traveling motor and a transaxle that are combined as a single unit. In addition, the power unit 66 is provided with at least a boost converter and an inverter that are also combined as a single unit, and is electrically connected via a power cable 70 to a battery 68 (described below).

The vehicle cabin 64, which is a substantially rectangular parallelepiped-shaped space, is formed on the vehicle rear side of the power unit compartment 60. In the vehicle cabin 64 of the present exemplary embodiment, a floor surface 52A is formed by a flat floor panel 72 that is provided in a vehicle front portion and vehicle central portion. As is shown in FIG. 2, the floor surface 52A is located on a vehicle lower side of the wheel axles of the front wheels 54A and the rear wheels 54B. Moreover, the vehicle cabin 64 is formed at a height that enables vehicle occupants to board the vehicle while standing upright.

The battery 68 is housed under the floor of the vehicle cabin 64, more specifically, on the vehicle lower side of the floor panel 72 and in the vehicle central portion thereof. The battery 68 is provided between the pair of center side members 56A that are located in the vehicle central portion.

Figure 3:
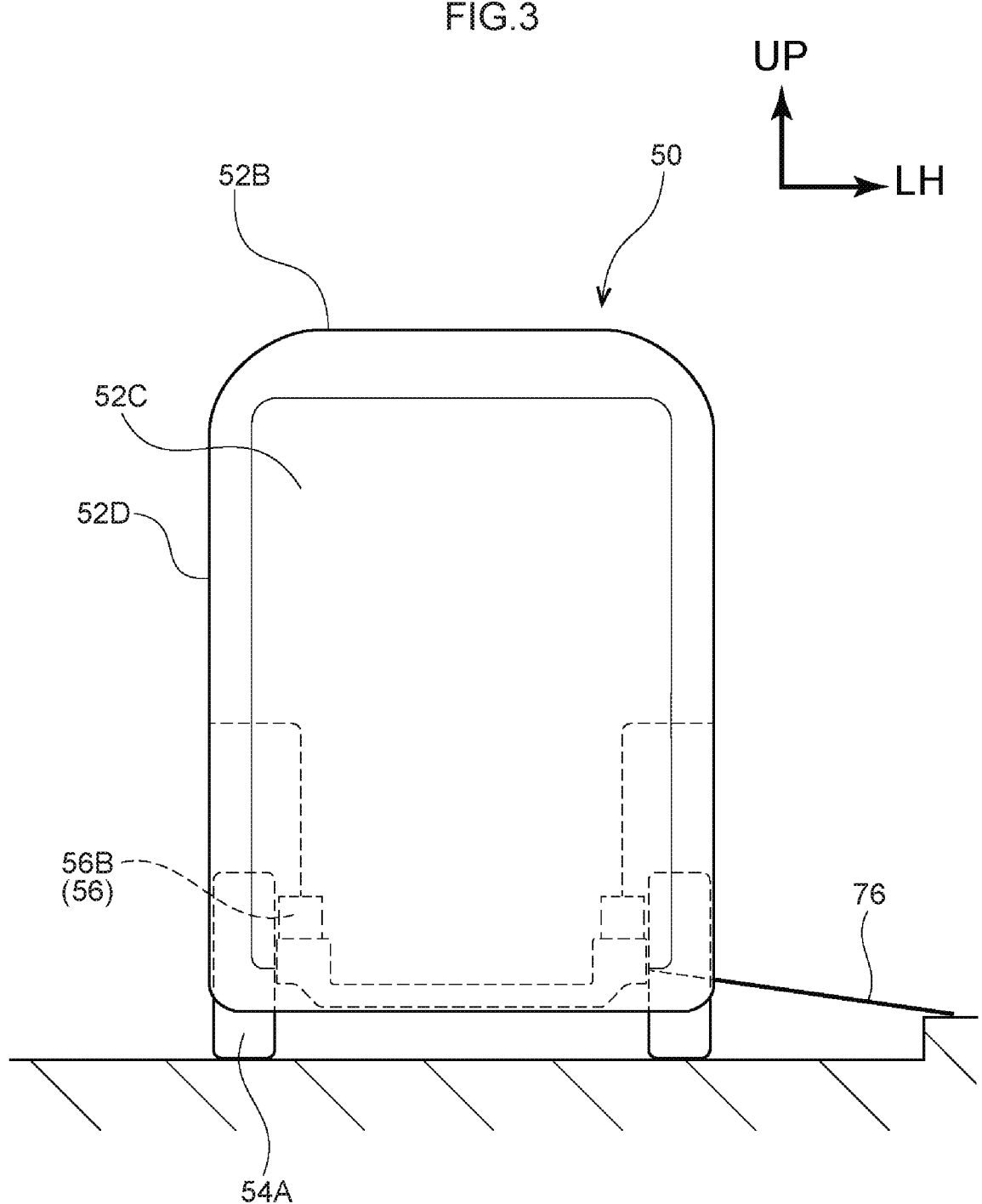
FIG. 3 is a front view of a self-driving vehicle.

A side entry/exit 74, through which an adult vehicle occupant is able to walk in order to board or alight from the vehicle, is provided in the side wall portion 52D at one vehicle side (i.e., on the left side in the vehicle width direction) of the vehicle cabin 64. This side entry/exit 74 is closed by a sliding door 74A that is fixed in position so as to be able to slide towards the vehicle front side (or towards the vehicle rear side). In addition, as is shown in FIG. 3, a side ramp 76 that extends diagonally downwards from the floor surface 52A towards a footpath (or towards a vehicle road) is provided in the side entry/exit 74. When the vehicle 50 is traveling, the side ramp 76 is housed within a side storage portion (not shown in the drawings) that is provided in a gap between the floor panel 72 and the battery 68. When a user boards or alights from the vehicle 50, the side ramp 76 is extracted from the side storage portion 76A towards the vehicle side.

Plural seats 78 on which users are able to sit are provided in the vehicle cabin 64. In other words, in the present exemplary embodiment, as is shown in FIG. 4, three seats 78A, 78B, and 78C are provided on the vehicle front side of the vehicle cabin 64 so that users sitting in these seats face towards the vehicle rear side. The seats 78A to 78C are arranged side-by-side in the vehicle width direction and are fixed to the floor panel 72. In addition, three seats 78D, 78E, and 78F are provided on the vehicle rear side of the vehicle cabin 64 so that users sitting in these seats face towards the vehicle front side. The seats 78D to 78F are arranged side-by-side in the vehicle width direction and are fixed to the floor panel 72.

The seat 78A includes a seat back portion 80 and a seat cushion portion 82. As is shown in FIG. 5, the seat back portion 80 is able to pivot around a first hinge 84 that is disposed in the vicinity of an upper end portion of the seat back portion. In addition, the seat cushion portion 82 is able to pivot around a second hinge 86 that is disposed in the vicinity of an lower end portion of the seat back portion 80. A user is able to sit down on the seat 78A when the seat back portion 80 and the seat cushion portion 82 are located in the positions shown by the solid lines in FIG. 5 (hereinafter, this state is referred to as a 'folded down state'). This folded down state is an example of a first state.

The seat 78A is able to be switched from the above-described folded down state to a state in which the seat back portion 80 is pivoted around the first hinge 84 so as to extend substantially in a vertical direction, and the seat cushion portion 82 is pivoted around the second hinge 86 so as to be substantially parallel with the seat back portion 80. Hereinafter, this state is referred to as a 'folded up state' (see FIG. 4). In this folded up state, it is difficult for a user to sit down in the seat, and this folded up state is an example of a second state.

The seats 78B to 78F have the same structure as the seat 78A and are able to be switched between the above-described folded down state and folded up state. A seat actuator 28 (see FIG. 1) is installed in the vehicle 50 for each one of the seats 78A through 78F, and these seat actuators 28 switch the respective seats 78A through 78F independently between the folded down state and the folded up state. As an example, FIG. 4 shows a situation in which the seat 78A is in the folded up state, while the seats 78B through 78F are in the folded down state.

As is shown in FIG. 1, the on-board system 20 of the vehicle 50 includes a bus 22, and plural electronic control units that perform mutually different types of control are each connected to the bus 22. Note that FIG. 1 shows only a portion of the on-board system 20 that relates to the present disclosure. Each electronic control unit includes a CPU, memory, and a non-volatile storage unit, and hereinafter is abbreviated to ECU. A seat control ECU 24 and a self-driving ECU 36 are included among the plural ECU connected to the bus 22.

The seat control ECU includes a CPU 24A, memory 24B, and a non-volatile storage unit 24C that stores a seat control program 26. As a result of the seat control program 26 read from the storage unit 24C being expanded in the memory 24B and executed by the CPU 24A, the seat control ECU is able to perform processing (described below in detail) to monitor any improper boarding of the vehicle 50 such as switching the state of the seat 78 and the like. Note that the seat control ECU 24 together with the server 12 is an example of a control unit.

The seat actuator 28, a cabin interior camera 30, a temperature sensor 32, and a buckle switch 34 are each connected to the seat control ECU 24. The cabin interior camera 30 is provided in a ceiling portion inside the vehicle cabin 64, and acquires images of the interior of the vehicle cabin 64 including the seats 78A through 78F. Note that, in the present exemplary embodiment, a stereo camera, which is able to discern whether or not an object is three-dimensional, is employed for the cabin interior camera 30. However, the present disclosure is not limited to this. The temperature sensor 32 is also provided in the ceiling portion inside the vehicle cabin 64, and detects a temperature inside the vehicle cabin 64 at a predetermined spatial resolution. One buckle switch 34 is provided in each of the seats 78, and detects whether or not a seat buckle that is provided in each of the seats 78 has been inserted in the catch by the user sitting in a particular seat 78. Note that the cabin interior camera 30 and the temperature sensor 32 are an example of a detecting unit.

Sensors 38 that detects the current situation of the vehicle 50 and actuators 40 that controls traveling of the vehicle 50 are connected to the self-driving ECU 36. Plural sensors of various types such as cameras, radar, LIDAR (LIght Detection And Ranging, or Laser Imaging Detection And Ranging), and GPS (Global Positioning System) sensors and the like are included in the sensors 38. Note that these cameras acquire images of peripheral areas around the vehicle 50, while the radar detects a direction and distance to a peripheral object near the vehicle 50 using radio waves, and the GPS detects a current position of the vehicle 50.

An acceleration/deceleration actuator that controls acceleration and deceleration of the vehicle 50, and a steering actuator that drives a steering mechanism of the vehicle 50 are included in the actuators 40. The self-driving ECU 36 performs self-driving of the vehicle 50 by controlling operations of the actuators 40 in accordance with the current situation of the vehicle 50 as detected by the sensors 38. Note that a planned route showing a subsequent route the vehicle 50 is planning to travel is stored in the storage unit of the self-driving ECU 36, and the self-driving ECU 36 causes the vehicle 50 to travel in accordance with the planned route stored in the storage unit.

A communication unit 42 that performs communication with the server 12 and the like via the network 16 is also connected to the bus 22 of the on-board system 20.

Next, an action of this exemplary embodiment will be described. The server 12 stores vehicle control information shown in FIG. 6 in the storage unit 12C. This vehicle control information includes, for each individual vehicle 50, information such as a vehicle ID (IDentification), current location, planned route, number of persons boarding, presence or otherwise of a wheelchair user, state of each seat 78, and alighting destinations of each user sitting in the seats 78. Note that the planned route shows the route that the vehicle 50 is subsequently planning to travel. The server 12 appropriately updates the vehicle control information stored in the storage unit 12C by performing communication with each vehicle 50 participating in the rideshare system 10.

Figure 8:
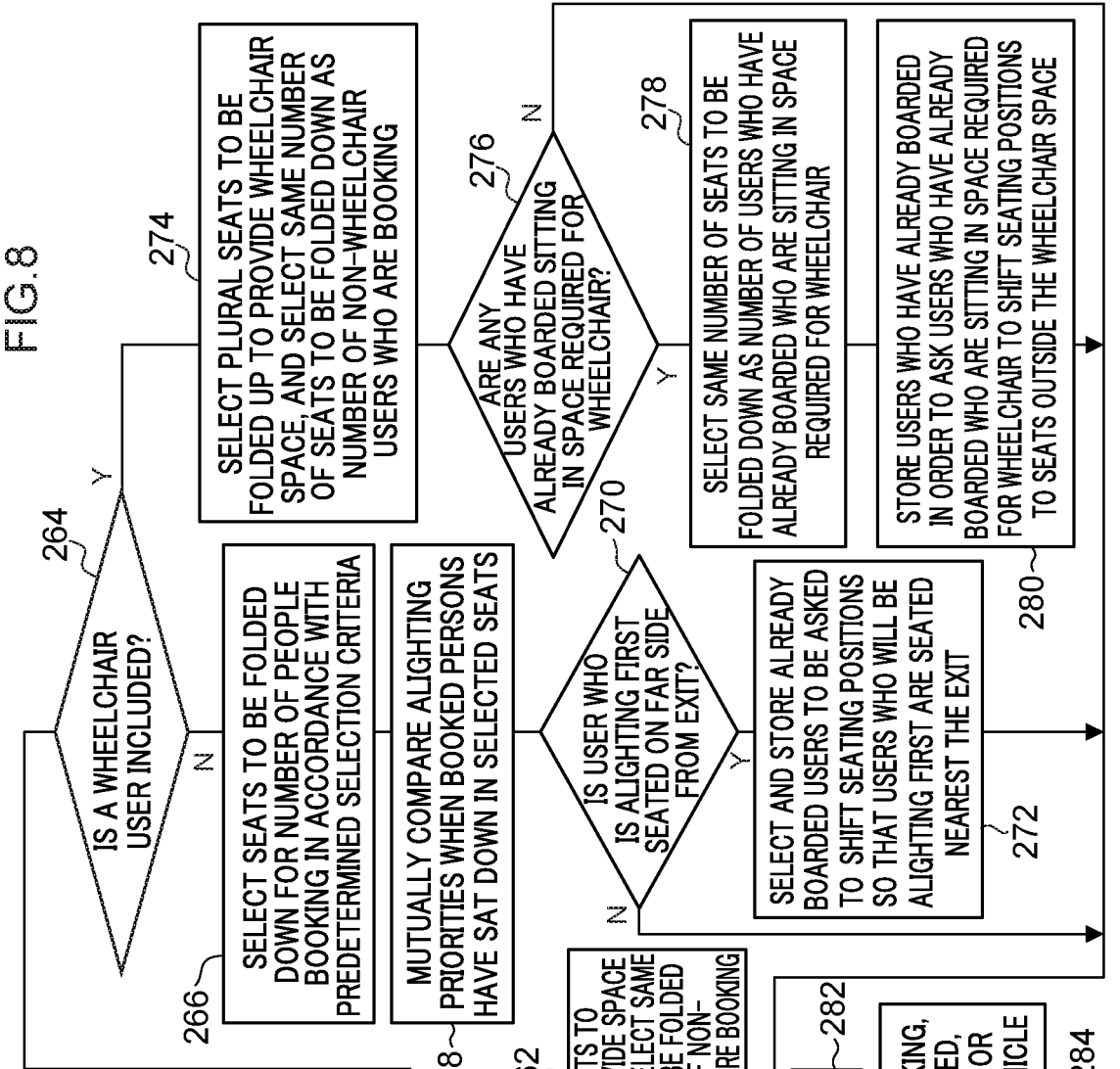
FIG. 8 is a flowchart showing an example of vehicle/seat reservation processing executed by a server.

When a user employs this rideshare service, by operating their mobile terminal 18, they transmit to the server 12 booking information such as their boarding location, alighting destination, number of persons being booked, and whether or not a wheelchair user is included (step 150 in FIG. 7). When the server 12 receives this booking information from the mobile terminal 18, it performs vehicle/seat reservation processing (step 152 in FIG. 7). This vehicle/seat reservation processing will now be described in detail with reference to FIG. 8.

In step 250, as a booking candidate, the server 12 retrieves from the vehicle control information a vehicle 50 that the number of persons booking, which information is included in the booking information received from the mobile terminal 18, is able to board, for example, a vehicle 50 that satisfies the formula: total number of seats (=six)−number of current passengers−number of persons booking. Note that, in the present exemplary embodiment, a single wheelchair user converts into four persons booking (or persons boarding). For example, if the received booking information states that the number of persons booking=two, of which one is a wheelchair user, then this is converted into number of persons booking=five, and vehicles 50 currently having only one or fewer passengers on board (provided that the passenger on-board is not a wheelchair user) are retrieved from the vehicle control information.

In step 252, from among the vehicles 50 extracted as booking candidates in the retrieval performed in step 250, the server 12 selects a vehicle 50 that is to be boarded by the person making the booking who transmitted the current booking information as the vehicle 50 that is to be booked. More specifically, for example, the planned routes of the vehicles 50 are compared with each other, and the vehicle 50 that is most capable of arriving at the boarding location is selected. Alternatively, it is possible to select the vehicle 50 that, for example, has the smallest increase to the total distance of their planned route when the boarding location and alighting destination are added to the planned route.

In step 254, the server 12 acquires information showing the state of each seat 78 in the selected vehicle 50 from the vehicle control information. In step 256, based on the information acquired in step 254, the server 12 determines whether or not users are present who have already boarded the selected vehicle 50.

If there are no passengers in the vehicle 50, in other words, if there are no users present in the selected vehicle 50, the determination in step 256 is negative and the process proceeds to step 258. In step 258, the server 12 determines whether or not the current booking information indicates that a wheelchair user will be boarding, in other words, whether or not a wheelchair user is included among the users corresponding to this particular booking.

If the determination in step 258 is negative, the process proceeds to step 260. In step 260, the server 12 selects a number of seats 78 that corresponds to the number of persons booking in accordance with predetermined seat selection criteria as seats to be folded down, and the process proceeds to step 282. An example of seat selection criteria is as follows.

(1) Precedence is given to selecting seats that face forwards and are on the left and right ends in the vehicle width direction.

(2) Precedence is given to selecting seats nearest to the vehicle entry point.

Figure 9:
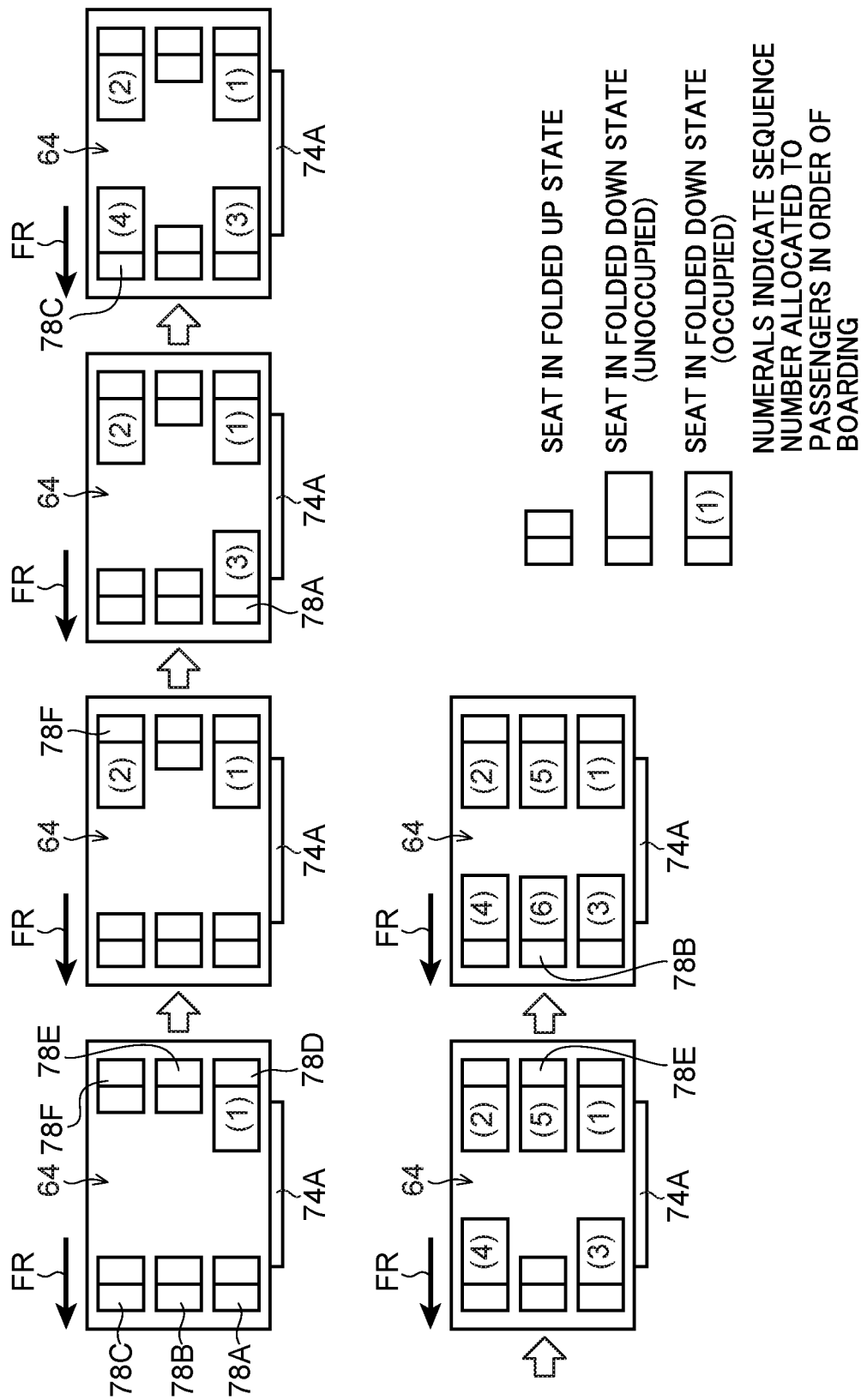
FIG. 9 is an image diagram showing an example of a seating sequence when only one user boards a vehicle each time.

For example, if the users of the vehicle 50 are single users boarding one at a time, then if the above-described seat selection criteria are followed, the seats 78 to be folded down are selected in the sequence shown in FIG. 9.

In other words, when there are no passengers in the vehicle 50, if the initial booking information received is for number of persons booking=one, then in accordance with the above-described seat selection criteria, the seat 78D that enables a user to sit facing forward, and that is nearest to the side entry/exit 74 is selected as the seat to be folded down. As is described below, the seat 78D is then switched to a folded-down state, and the initial user sits in the seat 78D (see (1) of FIG. 9).

When a user is already seated in the seat 78D, if the second booking information received is for number of persons booking=one, then in accordance with the above-described seat selection criteria, the seat 78F that enables a user to sit facing forward, and that is located on the right end in the vehicle width direction is selected from among the remaining seats 78 as the seat to be folded down. As is described below, the seat 78F is then switched to a folded-down state, and the second user sits in the seat 78F (see (2) of FIG. 9).

When users are already seated in the seats 78D and 78F, if the third booking information received is for number of persons booking=one, then in accordance with the above-described seat selection criteria, the seat 78A that is nearest to the side entry/exit 74 is selected from among the remaining seats 78 as the seat to be folded down. As is described below, the seat 78A is then switched to a folded-down state, and the third user sits in the seat 78A (see (3) of FIG. 9).

Furthermore, when users are already seated in the seats 78A, 78D and 78F, if the fourth booking information received is for number of persons booking=one, then in accordance with the above-described seat selection criteria, the seat 78C that is located on the right end in the vehicle width direction is selected from among the remaining seats 78 as the seat to be folded down. As is described below, the seat 78C is then switched to a folded-down state, and the fourth user sits in the seat 78C (see (4) of FIG. 9).

When users are already seated in the seats 78A, 78C, 78D and 78F, if the fifth booking information received is for number of persons booking=one, then in accordance with the above-described seat selection criteria, the seat 78E that enables a user to sit facing forward is selected from among the remaining seats 78 as the seat to be folded down. As is described below, the seat 78E is then switched to a folded-down state, and the fifth user sits in the seat 78E (see (5) of FIG. 9).

When users are already seated in the seats 78A, 78C, 78D, 78E and 78F, if the sixth booking information received is for number of persons booking=one, then in accordance with the above-described seat selection criteria, the remaining seat 78B is selected from among the remaining seats 78 as the seat to be folded down. As is described below, the seat 78B is then switched to a folded-down state, and the sixth user sits in the seat 78B (see FIG. 9 (6)).

Note that the seat selection criteria described above are simply one example thereof, and the seat selection criteria are not limited to this example. For example, if more than one person is making a booking, then selection criteria such as the following may be added to those described above.
(3) Precedence is given to selecting plural seats that are either next to each other or facing each other for multiple users belonging to the same booking.

In addition, if a wheelchair user is included among the users making the current booking, then the determination in step 258 is affirmative and the process proceeds to step 262. In step 262, the server 12 selects plural seats corresponding to the space required for the wheelchair as seats to be folded up, and if a non-wheelchair user is included among the persons making the booking, the server 12 also selects a seat for that user as a seat to be folded down.

Figure 11:
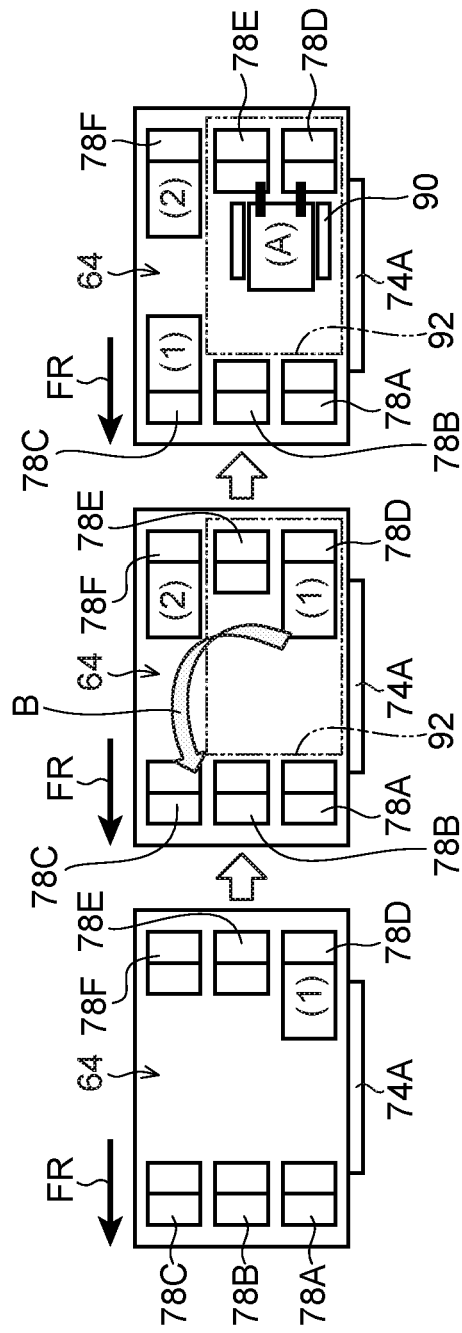
FIG. 11 is an image diagram illustrating a case in which a shift in the seating positions of users who have already boarded a self-driving vehicle is requested in conjunction with the boarding of a wheelchair user.

In the present exemplary embodiment, as is shown in FIG. 11, while a user of a wheelchair 90 is on board, the seats 78D and 78E are placed in the folded up state so as to ensure sufficient space to position the wheelchair 90, and the seats 78A and 78B are also placed in the folded-up state so as to ensure boarding and alighting accessibility. Accordingly, in the present exemplary embodiment, four seats, namely, the seats 78A, 78B, 78D, and 78E are the seats that correspond to a wheelchair space 92 shown in FIG. 11. If a user of the wheelchair 90 is included among the users making the current booking, the seats 78A, 78B, 78D, and 78E are selected as the seats to be folded up. Once the processing of step 262 has been performed, the process proceeds to step 282.

If, on the other hand, a user is already on board the vehicle 50, then the determination in step 256 is affirmative and the process proceeds to step 264. In step 264, the server 12 determines whether or not the current booking information indicates that a wheelchair user will be boarding, in other words, whether or not a wheelchair user is included among the users corresponding to this particular booking.

If the determination in step 264 is negative, the process proceeds to step 266. In step 266, in the same way as in the above-described step 260, the server 12 selects a number of seats 78 that corresponds to the number of persons booking in accordance with predetermined seat selection criteria as seats to be folded down.

In the next step 268, when users corresponding to the current booking are seated in the seats 78 selected in step 266 as seats to be folded down, the server 12 acquires an alighting destination of the passengers in each seat 78. Next, by comparing the alighting destinations of each seat 78 with the planned route of the vehicle 50, these alighting destinations are converted into an alighting sequence for the occupants of each seat 78, and the alighting sequence of each occupant of each seat 78 is compared with the others. Next, in step 270, if a user who is making the current booking is seated in a seat 78 selected as a seat to be folded down, the server 12 determines whether or not the user who will be alighting first is seated in the seat 78 located further from the side entry/exit 74.

If the determination in step 270 is negative, the process proceeds to step 282. If, however, the determination in step 270 is affirmative, the process proceeds to step 272. In step 272, the server 12 selects which user who is already seated will be requested to shift their seating position in order that the user who will be alighting first can sit nearer to the side entry/exit 74. Information about this selected user as well as the ID of the new seat 78 in which that user will be asked to sit are stored in the storage unit 12C. Once the processing of step 272 has been performed, the process proceeds to step 282.

Figure 10:
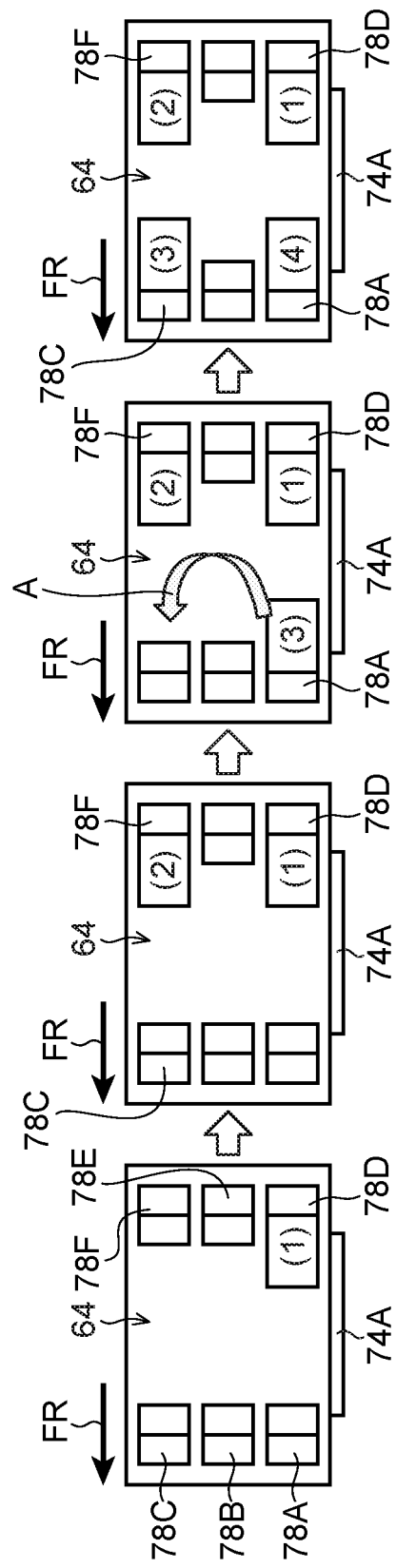
FIG. 10 is an image diagram illustrating a case in which a shift in the seating positions of users who have already boarded a self-driving vehicle is requested.

A specific example will now be described with reference to FIG. 10. In a state in which a first user is sitting in the seat 78D, a second user is sitting in the seat 78F, and a third user is sitting in the seat 78A, if booking information is received for a fourth user stating that the number of persons booking=1, then as is described above, the seat 78C is selected as the seat to be folded down. Here, if the fourth user will be alighting before the third user, then if this fourth user is seated in the seat 78C that is to be folded down, this fourth user will have trouble alighting at their alighting destination.

In a case such as this, the determination in step 270 is affirmative. Therefore, in step 272, information about the third user as being the user who has already boarded who has been requested to shift their seating position is stored in the storage unit 12C, so that the seating position of the third user who is already seated is shifted to the seat 78C which is further from the side entry/exit 74 (see an arrow A in FIG. 10). In addition, the ID of the seat 78C to which the third user is shifting their seating position is also stored in the storage unit 12C. The fourth user who will be alighting first is then seated in the seat 78A nearest to the side entry/exit 74.

Moreover, if the determination in step 264 is affirmative, the process proceeds to step 274. In step 274, the server 12 selects plural seats corresponding to the space required for the wheelchair as seats to be folded up, and if a non-wheelchair user is included among the persons making the booking, the server 12 also selects a seat for that user as a seat to be folded down. In step 276, the server 12 determines whether or not any user who has already boarded the vehicle 50 is currently sitting in the space required for the wheelchair. If the determination in step 276 is negative, the process proceeds to step 282.

If, however, the determination in step 276 is affirmative, the process proceeds to step 278. In step 278, the server 12 additionally selects, as seats to be folded down, the same number of seats 78 outside the wheelchair space 92 as the number of users who have already boarded and who are currently sitting in the wheelchair space 92. In step 280, in order to request a user who has already boarded and is currently sitting in the wheelchair space 92 to shift their seating position to a seat 78 that is outside the wheelchair space 92, information about the user who has already boarded, as well as the ID of the seat 78 to which that user is shifting is stored in the storage unit 12C.

A specific example will now be described with reference to FIG. 11. In a state in which a first user is sitting in the seat 78D, and a second user is sitting in the seat 78F, if booking information is received for a third user stating that the number of persons booking=1 and the person boarding is a wheelchair user, then the first user is now sitting within the wheelchair space 92. In this case, the seats 78A, 78B, 78D, and 78E within the wheelchair space 92 are selected as seats to be folded up, and the seat 78C outside the wheelchair space 92 is selected as the seat to be folded down. In addition, information about the first user as being the user who has already boarded who has been requested to shift their seating position, as well as the ID of the seat 78C to which the first user is shifting are stored in the storage unit 12C, so that the seating position of the first user who has already boarded is shifted to the seat 78C outside the wheelchair space 92 (see an arrow B in FIG. 11).

In step 282, the server 12 transmits information such as the ID of the vehicle 50, the IDs of designated seats, and the like to the mobile terminal 18 held by the person making the booking. In step 284, the server 12 transmits information such as the boarding location of the person making the booking, the number of passengers, the presence or otherwise of a wheelchair user, and the IDs of seats 78 whose state needs to be altered (i.e., which seats need to be folded up and which seats need to be folded down) to the vehicle 50, and the vehicle/seat reservation processing is ended.

When the vehicle/seat reservation processing by the server 12 is performed, the information such as the ID of the vehicle 50, the IDs of designated seats, and the like transmitted from the server 12 is received by the mobile terminal 18 held by the person making the booking (also see step 154 in FIG. 7). Consequently, as a result of a message such as, for example, 'a seat (seat ID=y) in a vehicle (vehicle ID=x) has been booked' being announced via the mobile terminal 18, information such as the ID of the vehicle 50 to be boarded, the ID of the designated seat, and the like can be ascertained by the person making the booking. Note that it is also possible for the ID of each individual vehicle 50 to be displayed in advance on an external surface of each vehicle 50, and for the ID of each individual seat to be displayed in advance on each seat 78.

The information such as the boarding location of the person making the booking, the number of passengers, the presence or otherwise of a wheelchair user, and the like transmitted from the server 12 is received by the communication unit 42 of the vehicle 50, and is forwarded to the seat control ECU 24. When the seat control ECU 24 receives information such as the boarding location and the like of the person making the booking, it performs communication with the self-driving ECU 36, and causes the received boarding location of the person making the booking to be added to the planned route stored in the storage unit of the self-driving ECU 36 (see also step 156 in FIG. 7).

Next, the seat control ECU 24 waits on standby for the vehicle 50 to arrive at the next stopping point (either a boarding location or an alighting destination) on the planned route (see also step 158 in FIG. 7). When it is announced by the self-driving ECU 36 that the vehicle 50 has arrived at a boarding location on the planned route, the seat control ECU 24 controls the seat actuator 28 such that seats 78 whose IDs have been announced as belonging to seats to be folded down are switched to the folded down state (see also step 160 in FIG. 7). When the seats 78 whose IDs have been announced as belonging to seats to be folded down have completed this switch to the folded down state, the seat control ECU 24 announces to the server 12 that the folding down of the seats 78 has been completed (see also step 162 in FIG. 7).

When the server 12 receives the announcement from the seat control ECU 24 that the folding down of the seats 78 has been completed, the server 12 firstly updates the vehicle control information, and then determines whether or not there is any user who has already boarded who will have to shift their seating position when the next user boards (see also step 164 in FIG. 7). If this determination is negative, the person making the booking is requested to board the vehicle (described below), however, if this determination is affirmative, the server 12 transmits to the mobile terminal 18 held by the user who has already boarded and who is required to shift their seating position information requesting the seating shift and also the ID of the seat 78 to which that user is being requested to shift (see also step 166 in FIG. 7). Additionally, the server 12 instructs the seat control ECU 24 of the vehicle 50 to announce the ID of the seat 78 to which the user is being requested to shift, and to also detect the seating shift performed by that user.

In this case, the information requesting the seating shift and the ID of the seat 78 to which that user is being requested to shift are received by the mobile terminal 18 held by the user who has already boarded and who is required to shift their seating position (see also step 168 in FIG. 7). As a consequence, for example, a message requesting the seating shift such as 'Please move to the seat having seat ID=z' is announced via the mobile terminal 18 held by the user who has already boarded and who is required to shift their seating position.

In accordance with the request made through a message or the like announced via the mobile terminal 18, the user who has already boarded and who is required to shift their seating position performs an action to move to the announced seat 78 (i.e., shifts their seating position) (see also step 170 in FIG. 7). While the user is performing the action to shift their seating position in accordance with the instruction from the server 12, the seat control ECU 24 monitors the action of the user based on detection results from the cabin interior camera 30 and the temperature sensor 32 (see also step 172 in FIG. 7). When the seat control ECU 24 detects that the action to shift their seating position has been completed by the user, the seat control ECU 24 announces to the server 12 that the seating shift has been completed (see also step 174 in FIG. 7). As a consequence, the server 12 updates the vehicle control information.

Next, based on whether or not the ID of a seat 78 that is to be folded up has been announced by the server 12, the seat control ECU 24 determines whether or not any seat 78 needs to be folded up (see also step 176). If this determination is negative, the seat control ECU 24 waits on standby until an instruction is issued by the server 12. If, however, this determination is affirmative, the seat control ECU 24 controls the seat actuator 28 such that the seat 78 whose ID was announced as belonging to the seat needing to be folded up is switched to the folded up state (see also step 178 in FIG. 7). When the seat 78 whose ID was announced as belonging to the seat needing to be folded up has completed the switch to the folded up state, the seat control ECU 24 announces to the server 12 that the folding up of the seat 78 has been completed (see also step 180 in FIG. 7). As a consequence, the server 12 updates the vehicle control information.

By performing the above-described vehicle/seat reservation processing, the server 12 ascertains whether or not there is a seating shift to be performed by a user, and whether or not there is a seat 78 that needs to be folded up. Because of this, after it been announced by the seat control ECU 24 of the vehicle 50 that the folding down of the seat 78 has been completed, if there is a seating shift to be performed by a user, the server 12 waits on standby until the completion of the seating shift is announced by the seat control ECU 24 of the vehicle 50. Moreover, if there is a seat 78 that needs to be folded up, the server 12 waits on standby until the completion of the folding up of the seat 78 is announced by the seat control ECU 24 of the vehicle 50.

When the server 12 has received all of the planned announcements from the seat control ECU 24 of the vehicle 50, the server 12 transmits information requesting that the person making the booking board the vehicle 50 to the mobile terminal 18 held by this person (see also step 182 in FIG. 7). In addition, the server 12 also announces the number of people boarding the vehicle and the like to the seat control ECU of the vehicle 50, and instructs the seat control ECU 24 to perform processing to monitor any improper boarding by a user.

Information requesting that the person making the booking board the vehicle is received by the mobile terminal 18 held by this person (see also step 184 in FIG. 7), and a message such as, for example, 'Please board vehicle having vehicle ID=x, and sit in seat having seat ID=y' is announced via this mobile terminal 18. As a result, the person making the booking ascertains that they are now able to board the vehicle 50, and boards the vehicle 50 having the announced ID, sits in the seat 78 having the announced ID, and performs an operation to buckle their seat belt (see also step 186 in FIG. 7).

In addition, while the person making the booking is performing the above-described operations in accordance with instructions from the server 12, the seat control ECU 24 of the vehicle 50 performs improper boarding monitoring processing (see also step 188 in FIG. 7). Hereinafter, this improper boarding monitoring processing will be described with reference to FIG. 12.

In step 300, the seat control ECU 24 sets a value obtained by adding the number of persons boarding as announced by the server 12 to the number of users who are already on board the vehicle 50 as a planned number of persons x. In step 302, the seat control ECU 24 sets a variable i to 0. In step 304, the seat control ECU 24 retrieves as yet unextracted three-dimensional objects present within the vehicle cabin 64 using the cabin interior camera 30. In step 306, the seat control ECU 24 determines whether or not a three-dimensional object was extracted in the retrieval performed in step 304.

If the determination in step 306 is affirmative, the process proceeds to step 308. In step 308, the seat control ECU 24 detects a temperature of the three-dimensional object extracted in the retrieval performed in step 304 using the temperature sensor 32. In step 310, based on whether or not the temperature detected in step 308 is within a temperature range of a human body, the seat control ECU 24 determines whether or not the three-dimensional object extracted in the retrieval performed in step 304 is a person. If the determination in step 310 is negative, the process returns to step 304.

If, however, the determination in step 310 is affirmative, the process proceeds to step 312. In step 312, in order to prevent the three-dimensional object extracted in the retrieval performed in step 304 being extracted again, a label is given to the three-dimensional object extracted in the retrieval performed in step 304. In the next step 314, the seat control ECU 24 increments the variable i by one. Once the processing of step 314 has been performed, the process returns to step 304.

In this way, in step 304 through step 314, the persons present inside the vehicle cabin 64 are retrieved in sequence, and the total number thereof is stored as the integer i. When all of the persons inside the vehicle cabin 64 have been extracted, the determination in step 306 is negative, and the process proceeds to step 316. In step 316, the seat control ECU 24 determines whether or not the variable i is equal to or less than the planned number of persons x (see also step 190 in FIG. 7).

If the determination in step 316 is negative, that means that the total number of persons i present within the vehicle cabin 64 is greater than the planned number of persons x. As a consequence, it is determined that an attempt to board improperly is being made, and the process proceeds to step 318. In step 318, the seat control ECU 24 performs processing to warn of improper boarding. Examples of this warning processing include processing such as, for example, generating a warning sound, or lighting or flashing a warning lamp, or transmitting information warning about an improper boarding to the mobile terminals 18 held by users who are on board the vehicle 50. Once the processing of step 318 has been performed, the process returns to step 302. Accordingly, the warning processing of step 318 is continued until the total number of persons i present within the vehicle cabin 64 is equal to or less than the planned number of persons x, so that the determination in step 316 is affirmative. During this time, the vehicle 50 remains held in a stopped state.

When the total number of persons i present within the vehicle cabin 64 is equal to or less than the planned number of persons x, the determination in step 316 is affirmative and the process proceeds to step 320. In step 320, based on the position and shape of each three-dimensional object labeled in step 312, the seat control ECU 24 detects whether or not each of the users present within the vehicle cabin 64 is seated in a seat 78. In step 322, based on the result of the seating detection performed in step 320, the seat control ECU 24 determines whether or not all of the users present within the vehicle cabin 64 are seated in a seat 78.

If a user who is not seated in a seat 78 is present within the vehicle cabin 64, the determination in step 322 is negative and the process proceeds to step 324. In step 324, the seat control ECU 24 performs processing to request users to be seated. Examples of this seating request processing also include processing such as, for example, generating a warning sound, or lighting or flashing a warning lamp, or transmitting information to the mobile terminals 18 held by users who are planning on sitting in an unoccupied seat 78 urging that those users take their seat. Once the processing of step 324 has been performed, the process returns to step 320. Accordingly, the seating request processing of step 324 is continued until the all of the users present within the vehicle cabin 64 are seated, so that the determination in step 322 is affirmative. During this time, the vehicle 50 remains held in a stopped state.

If, however, all of the users present within the vehicle cabin 64 are seated in a seat 78, the determination in step 322 is affirmative, and the process proceeds to step 326. In step 326, based on detection signals from the buckle switches 34, the seat control ECU 24 detects whether each one of the users who is present within the vehicle cabin 64 and is seated in a seat 78 has buckled their seatbelt. In step 328, based on the result of the seatbelt buckling detection performed in step 326, the seat control ECU 24 determines whether or not all of the users who are present within the vehicle cabin 64 and are seated in a seat 78 has buckled their seatbelt.

If user who has not buckled their seatbelt is present in the vehicle cabin 64, the determination in step 328 is negative and the process proceeds to step 330. In step 330, the seat control ECU 24 performs processing to request the user buckle their seatbelt. Examples of this processing to request that the user buckle their seatbelt also include processing such as, for example, generating a warning sound, or lighting or flashing a warning lamp, or transmitting information to the mobile terminals 18 held by users who are sitting in a seat 78 whose occupant has not buckled their seatbelt urging that those users buckle their seatbelt. Once the processing of step 330 has been performed, the process returns to step 326. Accordingly, the processing of step 330 requesting that a user buckle their seatbelt is continued until the all of the users present within the vehicle cabin 64 have buckled their seatbelt, so that the determination in step 328 is affirmative.

Once all of the users present within the vehicle cabin 64 are seated in a seat 78 and have buckled their seatbelt, the determination in step 328 is affirmative and the process proceeds to step 332. In step 332, the seat control ECU 24 announces to the server 12 and the self-driving ECU 36 that the persons making the booking have completed their boarding of the vehicle 50 (se also step 192 in FIG. 7), and the improper boarding monitoring processing is ended. As a result, the server 12 updates the vehicle control information.

Once the seat control ECU 24 has announced that boarding has been completed, the self-driving ECU 36 causes the vehicle 50 to depart for the next stopping point on the planned route (see also step 194 in FIG. 7). While the vehicle 50 is traveling, the seat control ECU 24 waits on standby until the vehicle 50 arrives at the next stopping point (either a boarding location or an alighting destination) on the planned route (see also step 196 in FIG. 7). When it is announced by the self-driving ECU 36 that the vehicle 50 has arrived at an alighting destination on the planned route, the seat control ECU 24 announces the arrival at the alighting destination to the server 12 (see also step 198 in FIG. 7).

When the server 12 receives the announcement from the seat control ECU 24 that the vehicle 50 has arrived at the alighting destination, firstly, the server 12 refers to the vehicle control information, and specifies the user who is to alight from the vehicle 50 at the arrived-at alighting destination. In addition, the information requesting that the specified user alight is also transmitted to the mobile terminal 18 held by that user (see also step 200 in FIG. 7). In addition, the server also announces the number of users who will be alighting (i.e. the alighting number) at the arrived-at alighting destination to the seat control ECU 24 of the vehicle 50.

Consequently, as a result of information requesting that the user alight being received by the mobile terminal 18 held by the user who is alighting (see also step 202 in FIG. 7), and a message urging the user alight then being announced via the mobile terminal 18, the arrival of the vehicle 50 at the alighting destination that was previously booked is made known to the user. The user then performs the actions of unbuckling their seatbelt and alighting from the vehicle 50 (see also step 204 in FIG. 7).

When the number of persons alighting is announced to the seat control ECU 24 by the server 12, the seat control ECU 24 monitors the actions of the user based on the cabin interior camera 30 and the temperature sensor 32 while the user is performing the alighting action (see also step 206 in FIG. 7). When the seat control ECU 24 detects that the announced number of users to alight have finished alighting from the vehicle 50, the seat control ECU 24 announces that alighting has been completed to the server 12 (see also step 208 in FIG. 7). As a result, the server 12 updates the vehicle control information.

Figure 12:
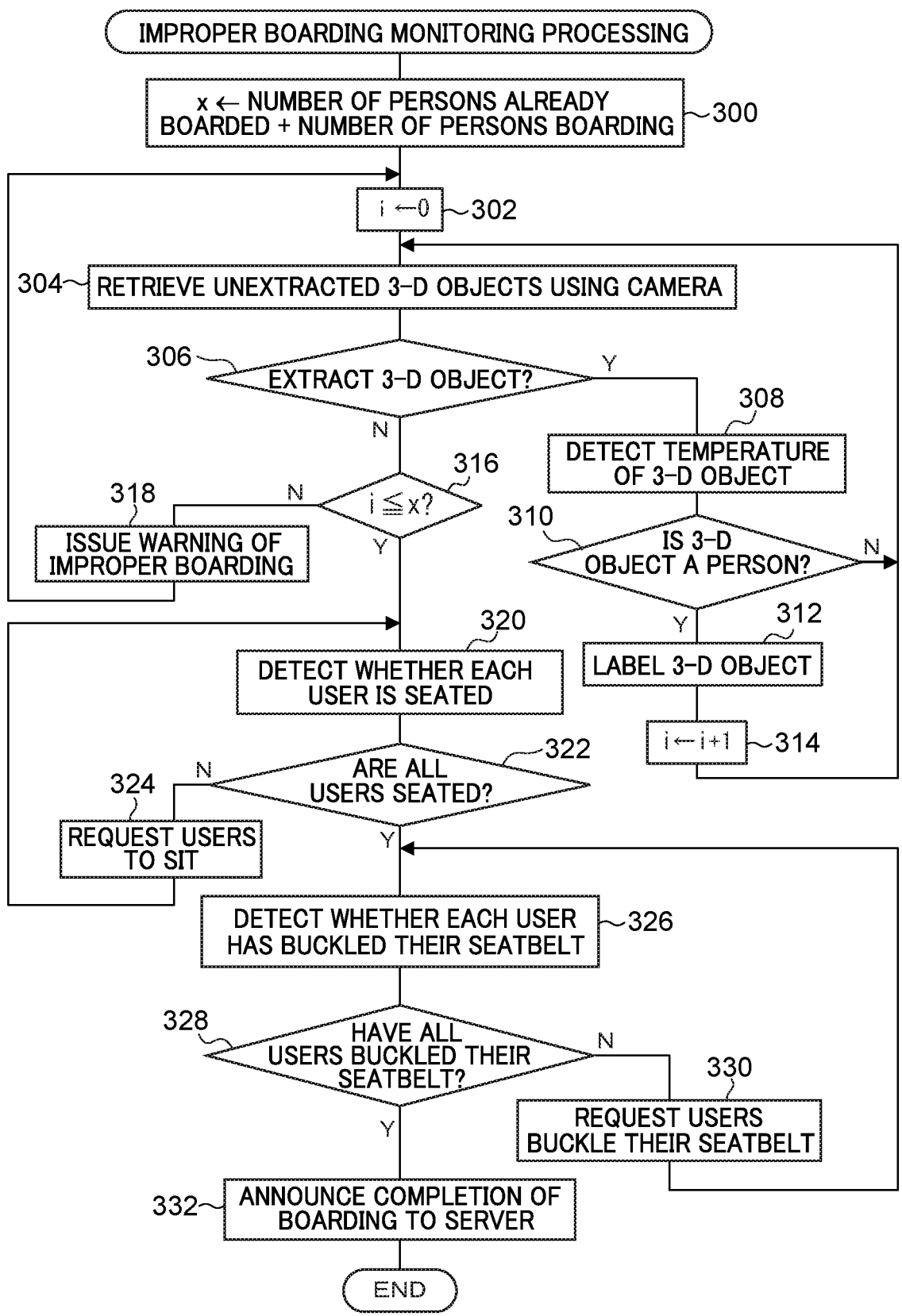
FIG. 12 is a flowchart showing an example of improper boarding monitoring processing executed by a seat control ECU.

Note that, if the number of users that have alighted from the vehicle 50 is fewer than the number of persons to alight that was announced by the server 12, then in the same way as in step 318 in FIG. 12, it is possible for processing to warn about improper boarding to be performed.

When the announcement that alighting has been completed is made by the seat control ECU 24, the server 12 refers to the vehicle control information, and specifies the ID of the seat 78 vacated by the user who has just alighted from the vehicle 50. In addition, the server 12 announces the ID of the specified seat 78 to the seat control ECU 24 as being the ID of the seat 78 that is to be folded up (see also step 210 in FIG. 7). As a consequence, the seat control ECU 24 controls the seat actuator 28 such that the seat 78 whose ID was announced as belonging to the seat to be folded up is switched to the folded up state (see also step 212 in FIG. 7).

In this way, in the present exemplary embodiment, when the boarding by a user of a vehicle 50 in which are provided plural seats 78 that are capable of being switched between a folded down state, in which a user is able to sit down, and a folded up state, in which it is difficult for a user to sit down, is declared in advance, the same number of seats 78 as the number of declared persons boarding are switched to the folded down state before the declared users board. As a result, the present exemplary embodiment may inhibit improper boarding such as when a greater number of users board the vehicle 50 than a previously declared number of users.

In addition, in the present exemplary embodiment, users present within the vehicle cabin of the vehicle 50 are detected by the cabin interior camera 30 and the temperature sensor 32, and when the declared users have boarded the vehicle, if the increase in the detected number of users is greater than the declared number of users, the vehicle 50 is prevented from traveling. As a result, the present exemplary embodiment may more reliably inhibit improper boarding such as when a greater number of users board the vehicle 50 than a previously declared number of users.

In addition, in the present exemplary embodiment, when a user has alighted from the vehicle 50, the seat 78 vacated by the alighted user is switched to the folded up state. As a result, the present exemplary embodiment may additionally inhibit improper boarding such as when, for example, a person who has not declared their wish to board boards the vehicle 50 and sits in the seat 78 in place of an alighted user.

Furthermore, in the present exemplary embodiment, if a user who is confined to a wheelchair is included among the declared users, the seats 78 corresponding to the boarding position of the wheelchair user are switched to the folded up state before the declared users board the vehicle 50. As a result, boarding space for the wheelchair user is guaranteed, and the present exemplary embodiment may make provision for the boarding of wheelchair users as well.

In addition, in the present exemplary embodiment, if a first user is already sitting in a first seat 78, and no user is sitting in a second seat 78 that is further from the side entry/exit 74 of the vehicle 50 than the first seat, then if a second user who will be alighting from the vehicle 50 before the first user declares their wish to board the vehicle 50, the following processing is performed. Namely, the second seat 78 is switched to the folded down state before the second user boards the vehicle 50, and the first user is asked to move to this second seat 78. The second user is then requested to sit in the first seat 78 that has been left in the folded down state. As a result, getting on and getting off the vehicle may be made easier when the second user alights from the vehicle.

In addition, in the present exemplary embodiment, the seats 78 include the seat back portion 80 and the seat cushion portion 82. The seat back portion 80 is pivoted around the first hinge 84 that is disposed in the vicinity of the upper end portion of the seat back portion 80, while the seat cushion portion 82 is pivoted around the second hinge 86 that is disposed in the vicinity of the lower end portion of the seat back portion 80. In the folded up state of the seats 78, the seat back portion 80 is pivoted around the first hinge 84 so as to extend in a vertical direction, and the seat cushion portion 82 is pivoted around the second hinge 86 so as to be substantially parallel with the seat back portion 80. As a result, since a seat 78 that has been switched to the folded up state is folded up so that an occupiable space thereof is reduced to a minimum, vehicle cabin space inside the vehicle 50 may be utilized effectively.

Note that, in the above description, a case in which the server 12 and the seat control ECU 24 operate in mutual collaboration so as to function as an example of a control unit, is described. However, the division of functions between the server 12 and the seat control ECU 24 is not limited to the aspect described above. For example, the server 12 may mainly perform the communication with the mobile terminals 18 and the selection of the vehicle 50 during a booking, and the remaining processing (for example, the processing to select the seats 78 to be switched to the folded down state and the like) may be performed by the seat control ECU 24.

In addition, a case in which the vehicle 50 is an electric vehicle, is described above. However, the present disclosure is not limited thereto.

Furthermore, a case in which two rows of seats 78 are disposed facing each other with each row having three seats 78 provided side-by-side in the vehicle width direction, is described. However, the number and placement of the seats 78 is not limited thereto. An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. A vehicle seat control device comprising:
a control unit that, in a case in which at least one user has declared in advance a desire to board a self-driving vehicle having a plurality of seats that are switchable between a first state in which a user is able to sit down, and a second state that impedes a user sitting down, switches a same number of seats as a number of the at least one user to the first state before the at least one user boards the vehicle,
wherein, in a case in which a first user is sitting in a first one of the plurality of seats, and in a case in which a second user, who intends to disembark from the vehicle prior to the first user, declares a wish to board when no user is sitting in a second one of the plurality of seats, which is further from an entry/exit of the self-driving vehicle than the first one of the plurality of seats, the control unit switches the second one of the plurality of seats to the first state before the second user boards the vehicle and requests the first user to move to the second one of the plurality of seats, and requests the second user to sit in the first one of the plurality of seats, which has been maintained in the first state.

2. The vehicle seat control device according to claim 1, further comprising a detection unit that detects users present within a vehicle cabin of the self-driving vehicle,
wherein, in a case in which the at least one user has boarded the vehicle, the control unit stops the self-driving vehicle from traveling, when an increase in a number of users detected by the detecting unit is greater than the number of the at least one user.

3. The vehicle seat control device according to claim 1, wherein, in a case in which a particular user disembarks from the self-driving vehicle, the control unit switches a seat vacated by the particular user to the second state.

4. The vehicle seat control device according to claim 1, wherein, in a case in which the at least one user includes a user using a wheelchair, the control unit switches one or more seats that correspond to a boarding position of the user using the wheelchair to the second state, before the at least one user boards the vehicle.

5. The vehicle seat control device according to claim 4, wherein seats corresponding to the boarding position of the user using the wheelchair are a plurality of seats arranged side-by-side.

6. The vehicle seat control device according to claim 1, wherein each seat includes a seat back portion and a seat cushion portion, and the seat back portion is configured to pivot around a first hinge that is disposed in a vicinity of an upper end portion of the seat back portion, and the seat cushion portion is configured to pivot around a second hinge that is disposed in a vicinity of a lower end portion of the seat back portion, and
the second state is a state in which the seat back portion is pivoted around the first hinge so as to extend in a vertical direction, and the seat cushion portion is pivoted around the second hinge so as to be parallel with the seat back portion.

* * * * *